May 16, 1944.  E. F. HOHWART  2,348,975
CABLE CLAMP
Filed Oct. 2, 1941
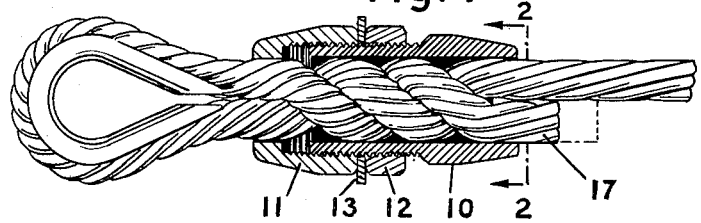
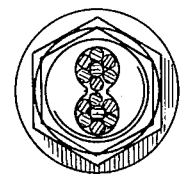
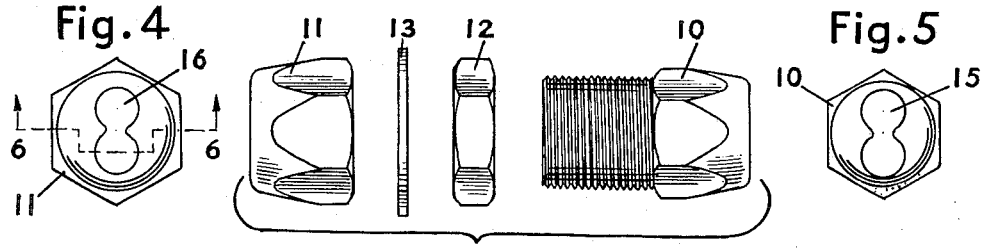
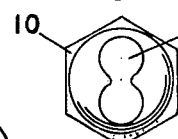
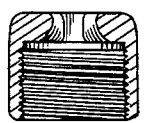
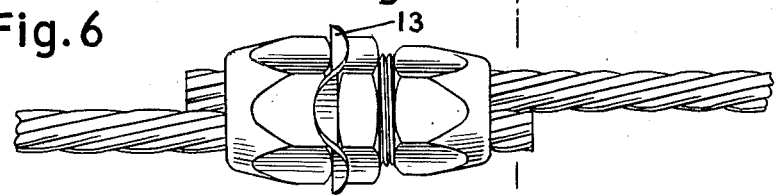
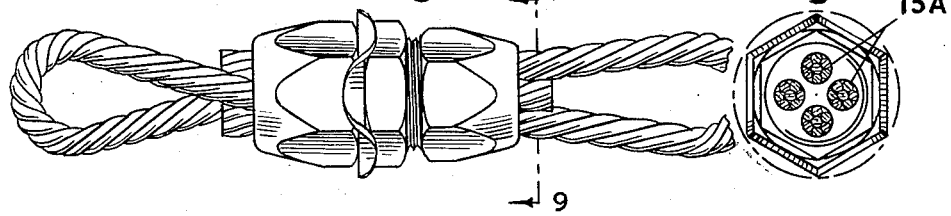
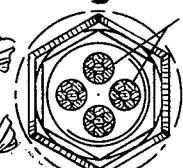
INVENTOR.
Ernest F. Hohwart
BY
His attys.

Patented May 16, 1944

2,348,975

UNITED STATES PATENT OFFICE 2,348,975

CABLE CLAMP

Ernest F. Hohwart, Detroit, Mich.

Application October 2, 1941, Serial No. 413,310

10 Claims. (Cl. 24—124)

The present invention relates to clamping and fastening devices for wire rope, cable, wire, or in fact virtually any elongated elements which are sufficiently flexible to be twisted. The invention is particularly concerned with improved means whereby two sections of wire, cable or the like may be secured together, either to form a loop, or to secure successive lengths to one another.

An important object of the invention is to provide an improved fastening device of the character indicated which is simple and inexpensive of construction, easily and quickly applicable to the cable or other elements to be fastened, and which provides a coupling the strength of which is greater than that of the held rope or cable itself, and which further, does not injure or impose any undue stress or strain upon the held element, or otherwise injure or interfere with its strength.

Still another object is to provide such a fastening device which may be secured in place with the aid of no other tools than ordinary wrenches, and which, when fastened, cannot be released, either accidentally or by any vibration or movement, or by stresses exerted upon the device in service.

Still another object is to provide such a fastening device, the action of which is independent of the helix of the rope or of the individual strands of the rope, and which will secure the cable with equal effectiveness whether such helices be right hand or left hand.

Another important object of the invention is to provide such a locking device which automatically takes up a certain part of the length of the rope or cable during fastening, such take-up amounting approximately to twice the diameter of the rope or cable, and being applied with great force, so that the fastening devices of my improved type also act as tightening agents, or turnbuckles, while being fastened.

A further object is to provide such a fastener which is as effective in the securing of the wire rope of the varieties made up of relatively few strands, as with those incorporating many strands. The cost of such wire rope is more or less proportional to the number of strands, the least expensive being that composed of seven strands, although such rope is relatively stiff and hard to handle, and fastening devices of previously known types have been less effective therewith, due to the relative incompressibility of cables or ropes of such character.

Other objects and advantages will be apparent to those skilled in the art upon reference to the following description and accompanying drawing.

In the drawing:

Fig. 1 is a longitudinal diametric section of a fastening device constructed in accordance with the present invention, showing the same applied to a loop of wire rope, the loop being shown closed and fastened.

Fig. 2 is a cross section taken substantially on the line 2—2 of Fig. 1, and looking in the direction of the arrows.

Fig. 3 is an exploded side elevational view showing the component parts separated from one another.

Figs. 4 and 5 are left and right end elevational views respectively.

Fig. 6 is a cross section taken substantially on the line 6—6 of Fig. 4, and looking in the direction of the arrows.

Fig. 7 is a side elevational view of the device showing the same applied in such manner as to connect two overlapping wire rope sections.

Fig. 8 is a similar side elevational view of a somewhat modified construction adapted to accommodate four ropes or cables; and Fig. 9 is a cross section taken substantially on the line 9—9 of Fig. 8, and looking in the direction of the arrows.

Referring now to the drawing, it will be seen that my improved cable fastening device consists essentially of two threadedly interfitting hollow nipples 10 and 11, and a jamb nut 12, with which is also used a deformable lock washer 13.

In the form of the device shown in Figs. 1 to 7 inclusive, the end wall of each nipple section is provided with a single elongated aperture, as 15, 16, which is so constricted at its center as to constitute in effect two overlapping or intersecting circular holes, each of such size as to receive a single cable or wire of approximately the size for which the coupling is designed. The nipples will be seen to define a substantially cylindrical enclosed area when the parts are assembled. The enclosed area is of such size as to accommodate the cable and to permit intertwining or twisting together thereof, the length of the parts being such that when the device is fastened (in a manner presently to be described) the internal area will accommodate a predetermined number of helices formed by the twists, which in turn fill the interior. In the couplings shown, the design is such as to permit the interior opening to receive approximately one and one-half turns of the cable.

The threaded areas of the interfitting parts are of sufficient length to permit the same to be unscrewed, from their fully interengaged relation, a number of turns corresponding to the wanted degree of twisting or intertwining of the cable, while still affording ample threaded interengagement for firm holding of the parts, and the threaded portion of the male element will be seen to be of such length as to accommodate also the lock nut 12 and washer 13. The holes 15 and 16 are so located as to be aligned with one another when the parts are screwed together, so that the two lengths which are to be twisted may project therethrough side by side.

The device is applied fully assembled and screwed together, by simply slipping it over the cable or other elements to be fastened. In Fig. 1 the two cable parts comprise the ends of a section which has been looped to form a bight. The fastening assembly is slipped over the cable sections far enough so that the free end 17 of the cable projects sufficiently from the end of the fastening devices. The two sections 10 and 11 are then unscrewed, by means of wrenches or the like, until the resultant twisting of the cable so fills the interior of the coupling assembly as to bind the same and prevent further unscrewing of the parts. The twisted parts of the cable are thus held firmly in the twisted relation, and the coupling parts may be securely fastened in that relation by tightening of the jamb nut 12, as shown in Fig. 1. Due to the relatively great thickness of the cable, compared with the relatively small lead or pitch of the threads, the helical portion of the cable formed by the twisting fills the interior with relatively few turns of the parts, and after fastening, tension upon the wire or cable tends to screw parts 10, 11 together, thus tending to tighten the jamb nut.

In other words, when the fastening is thus made, the intertwining of the cable ends is accomplished by partially unscrewing the coupling sections 10 and 11 for approximately one or two complete turns, by which the intertwining of the cable ends is made to substantially fill the interior of the coupling assembly. Thereafter, when the fastened cable ends tend to unwind, as because of tension due to their twisting, they cannot cause the coupling sections 10 and 11 to separate, but instead they would tend to re-screw the coupling sections toward their fully interengaged positions. The deformable washer 13, however, coacting with the jamb-nut 12 holds the coupling section in the desired partially unscrewed positions as long as desired.

In twisting the cable in the manner described, both twisted parts are drawn inwardly, into the interior of the coupling, in such manner as to shorten the effective length of the cable or wire, which is thus tightened during the act of fastening. I have found that with a fastening device constructed as shown, and designed to permit about one and one-half turns, the cable is drawn in to an extent approximating its diameter at each end. This is highly advantageous in the tightening of guys and the like.

As shown in Fig. 7, the lock washer 13 may be bent in opposite directions, to overlie the wrench-receiving flats of the jamb nut and the member 11, thus positively locking the jamb nut against loosening. Fig. 7 will also be seen to show a coupling of the type illustrated in Fig. 1 used for the securing together of two ends of a pair of cables desired to be tied or joined.

The construction shown in Figs. 8 and 9, although the same in principle, is modified to accommodate four lengths of cable rather than two, four holes as 15A being uniformly spaced in the end wall of each coupling member. These are likewise arranged to be in corresponding alignment with one another when the parts are fully interfitted, and to intertwine the cable sections as the parts are partially unscrewed. It will be recognized that such modified coupling element is adapted to secure wire or cable not only in the forming of a double loop, as illustrated in Fig. 8, but wherever it may be desired to secure together four such elements.

I am aware that the invention may be embodied in other specific forms without departing from the spirit or essential attributes thereof, and I therefore desire the present embodiments to be considered in all respects as illustrative and not restrictive; reference being had to the appended claims rather than to the foregoing description to indicate the scope of the invention.

I claim:

1. Means for fastening together elongated elements which are sufficiently flexible to be intertwined, comprising a pair of members adapted to be threadedly connected, said members having interior openings and open abutting ends, whereby when so threadedly connected said members are adapted to enclose a hollow interior, said members also having end walls correspondingly apertured, each with a plurality of apertures in substantial alignment with the apertures of the other member but disposed non-concentrically with respect to the axis of the assembly, whereby when elements to be fastened are projected through said corresponding end wall apertures in such manner as to extend through said hollow interior, and said members are then turned with respect to one another, said elements are intertwined to fasten the same.

2. Means as set forth in claim 1 in which the members are adapted to threadedly interfit with one another, the lead of the threads being less than the diameter of the elements to be fastened by intertwining in said hollow interior.

3. Means as set forth in claim 1 in which one of said members is a male member and the other a female member, said members being adapted to be threadedly interfitted and the threaded area of the male member being longer than the effective threaded area of the female member, the lead of the threads being less than the diameter of the elements to be fastened, whereby said elements may be inserted when the male and female members are interfitted, and whereby the elements may be intertwined by partially unscrewing said members.

4. Means as set forth in claim 1 in which one of said members is a male member and the other a female member, said members being adapted to be threadedly interfitted and the threaded area of the male member being longer than the effective threaded area of the female member, the lead of the threads being less than the diameter of the elements to be fastened, whereby said elements may be intertwined by partially unscrewing said members, and means for locking said members against unwanted rotation.

5. Means as set forth in claim 1 in which one of said members is a male member and the other a female member, said members being adapted to be threadedly interfitted and the threaded area of the male member being longer than the effective threaded area of the female member, the lead of the threads being less than the diameter of the elements to be fastened, whereby said elements may be intertwined by partially unscrewing said members, and means for locking said members against unwanted rotation, comprising a jamb nut carried by the male member and engageable with the female member.

6. Means as set forth in claim 1 in which one of said members is a male member and the other a female member, said members being adapted to be threadedly interfitted and the threaded area of the male member being longer than the effective threaded area of the female member, the leads of the threads being less than the diameter of the elements to be fastened, whereby said elements may be intertwined by partially unscrewing said members, and means for locking said members against unwanted rotation comprising a jamb nut carried by the male member and a deformable washer arranged between the jamb nut and the female element, whereby after tightening of the jamb nut the washer may be deformed to so interengage parts of said nut and of the female member as to prevent further unwanted turning thereof.

7. Means for fastening together a plurality of flexible elements comprising a pair of hollow members threadedly interconnected to each other and each member being open at one end and having at its opposite end an end wall in which is provided a plurality of apertures spaced from the axis of said members, whereby the apertures in the respective end walls are aligned in certain positions of the members, and a jamb nut threaded upon one of said members and adapted to engage the open end of the other member, the arrangement being such that when the flexible elements are inserted through the aligned end wall aperture and the interior of said hollow members, rotation of the members with respect to each other will result in winding of the flexible elements upon each other within the interior of said members, and the jamb nut can then lock the members in such adjusted position with the flexible elements intertwined.

8. As a new article, a pair of members threaded together and enclosing twisted-together lengths of flexible members, the flights of the twist of said flexible members having the same direction of inclination as the threads of said pair of members, whereby untwisting of said flexible members tends to screw together said pair of members.

9. As a new article, a pair of members threaded together and enclosing twisted-together lengths of flexible members, the over-all diameter of said twisted-together lengths being substantially the same as the inside diameter of the pair of members and the flights of the twist of said flexible members having the same direction of inclination as the threads of said pair of members, whereby untwisting of said flexible members tends to screw together said pair of members.

10. A connector for flexible members capable of being twisted together, said connector consisting of a pair of nipples having male and female screw threads, whereby they may be fixed together and having slotted openings for the reception of such members, the threading on such nipples being of sufficient length to permit tightly twisting such members and to accommodate locking means, and locking means for the nipples.

ERNEST F. HOHWART.